Aug. 20, 1963 — J. W. SCHUETZ — 3,101,015
MANDREL BAR STEADIER
Filed Dec. 7, 1960 — 3 Sheets-Sheet 1
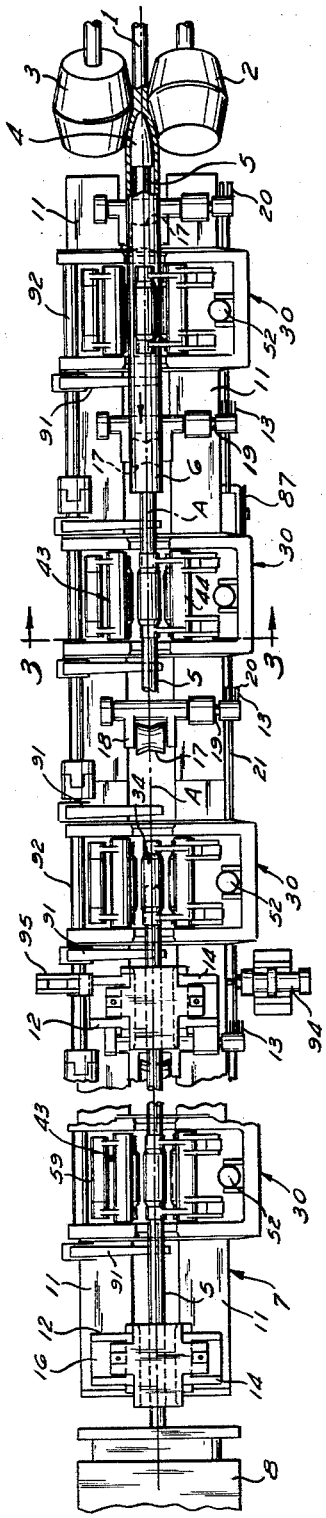
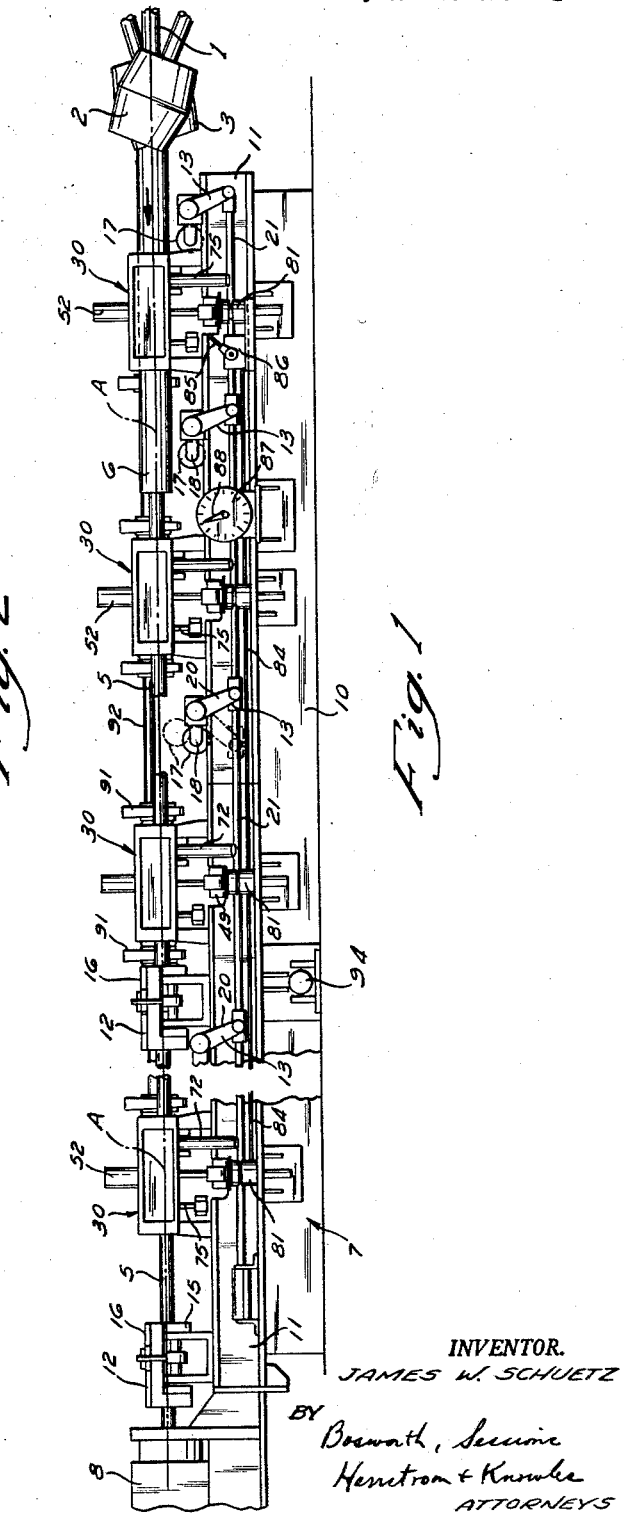
INVENTOR.
JAMES W. SCHUETZ
BY Bosworth, Sessions, Herrstrom & Knowles
ATTORNEYS Aug. 20, 1963   J. W. SCHUETZ   3,101,015
MANDREL BAR STEADIER
Filed Dec. 7, 1960   3 Sheets-Sheet 2

INVENTOR.
JAMES W. SCHUETZ
BY
Brewith, Sessions,
Herrstrom + Knowles
ATTORNEYS

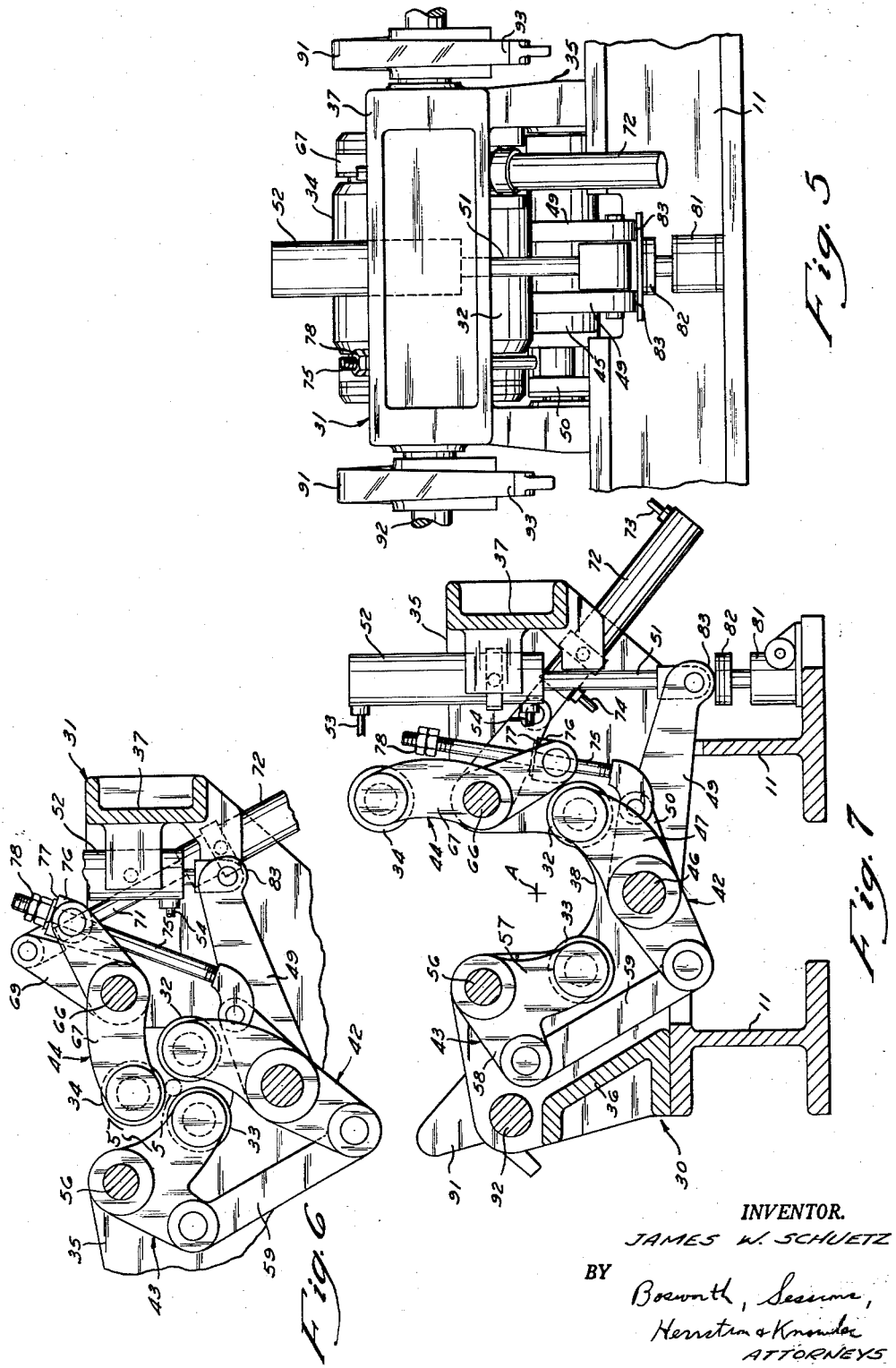

ent content, and which can be removed readily for maintenance. Other objects and advantages of the invention will be apparent from the following description of a preferred form, reference being made to the accompanying drawings in which:

United States Patent Office 3,101,015
Patented Aug. 20, 1963

3,101,015
MANDREL BAR STEADIER
James W. Schuetz, Pittsburgh, Pa., assignor to Blaw-Knox Company, Pittsburgh, Pa., a corporation of Delaware
Filed Dec. 7, 1960, Ser. No. 74,265
2 Claims. (Cl. 80—11)

This invention relates to the manufacture of seamless tubing, and more particularly to an improved mandrel bar steadier for piercing mills.

In the manufacture of seamless tubing, one of the initial operations is the piercing of a heated cylindrical solid metal billet by a pair of angularly disposed driven mill rolls which force the billet over a piercing point on the end of a mandrel bar. Since the billet is rotated by the mill rolls as it is fed over the piercing point, it is accordingly necessary to support the piercing point and the mandrel bar for rotation with the billet. The mandrel bar extends away from the mill rolls, in the direction of longitudinal movement of the billet over the piercing point, for a distance that is at least as great as the length of the longest tube to be formed on the mill. The rear end of the mandrel bar is rotatably supported by a suitable carriage which is adapted to withdraw the bar from the tube so that the tube can be removed from the outlet table on which it is received after the piercing operation, and then to return the bar to its working position with its piercing point adjacent the mill rolls.

A large compressive load is exerted on the rotary mandrel bar during the piercing operation. Inasmuch as modern piercing mills are adapted to handle billets which, when pierced, produce tubes or shells as long as fifty feet and having diameters ranging from three or four inches to eighteen inches or more, it is apparent that a very long and heavy bar is required to form a tube of large diameter and considerable length. In order to support the mandrel bar and prevent it from buckling and vibrating under high compressive loads as it is rotated during the piercing operation, the bar must be rotatably supported by some type of bar steadier. Furthermore, the pierced portion of the tube having the mandrel passing therethrough must also be rotatably supported and steadied.

Similar types of mandrel bar steadiers are also required in other machines handling tubes. Therefore, while the present invention finds its most important use in connection with tube piercing mills, it is to be understood that where reference is made in this specification or the appended claims to seamless tube mills, it is intended to include not only piercing mills but also other tube making equipment in which a rotating mandrel bar must be supported under longitudinal compression.

A general object of the present invention is the provision of an improved mandrel bar steadier for seamless tube mills or the like, whereby a mandrel bar can be accurately rotatably held in a desired position with respect to the billet being pierced, and supported during the piercing operation, so that the operation can be carried out without substantial buckling or vibration of the mandrel bar. Another object of the invention is the provision of a mandrel bar steadier having rollers that engage the mandrel bar or pierced tube, which rollers can be adjusted to support mandrels or tubes of various diameters without the necessity of changing the rollers. A further object is the provision of a mandrel bar steadier having such rollers which may be of relatively large diameter and hence have long life. Another object of the invention is to provide a roller type mandrel bar steadier that engages and rotates the mandrel bar or tube surrounding the bar, which steadier is simple, sturdy and trouble-free in operation. A further object of the invention is the provision of a mandrel bar steadier which can be adapted readily to the outlet tables of both existing and new piercing mills, and which can be removed readily for maintenance. Other objects and advantages of the invention will be apparent from the following description of a preferred form, reference being made to the accompanying drawings in which:

FIGURE 1 is a side elevation showing a piercing mill outlet table having several mandrel bar steadiers embodying the invention, and also somewhat diagrammatically illustrating the piercing mill rolls and the mandrel carriage for advancing and retracting the mandrel bar, portions of the pierced tube and other parts being broken away;

FIGURE 2 is a plan view of the apparatus shown in FIGURE 1;

FIGURE 5 is an end elevation of FIGURE 3, from the right and to the same scale;

Figure 3:
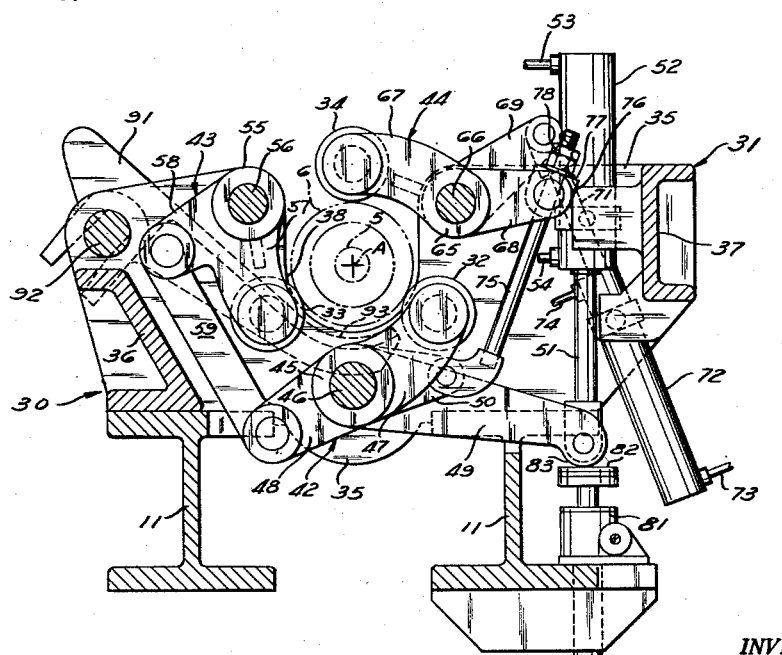
FIGURE 3 is a vertical sectional elevation, along lines 3—3 of FIGURES 2 and 4, showing to an enlarged scale one of the mandrel bar steadiers of the present invention with their rollers in their outermost positions to bear against the largest tube which will be handled by the apparatus.

FIGURE 6 is a portion of a cross section, corresponding generally to FIGURE 3 and to the same scale, of a mandrel bar steadier with its rollers in their innermost positions to bear against the smallest mandrel bar which can be handled by the device; and FIGURE 7 is a cross section, generally corresponding to FIGURE 3 and to the same scale, showing the top roller in its swung back position to provide clearance for removal of a finished tube.

In the apparatus shown in FIGURES 1 and 2, a billet 1, fed by any conventional type of inlet table (not shown) is passed between conventional piercing mill rolls 2 and 3 which force it over the point 4 of a mandrel bar 5 along a pass line A. The tube 6 formed from the billet is advanced in the direction shown by the arrows in FIGURES 1, 2 and 4 along the pass line A, and is received on and by an outlet table generally indicated by reference numeral 7. The mandrel bar extends for the length of the outlet table and is rotatably supported at its end remote from the piercing point by a mandrel carriage indicated diagrammatically by reference numeral 8. The mandrel carriage 8 is adapted to be retracted from the outlet table at the conclusion of the piercing operation to withdraw the mandrel bar 5 from the pierced tube so that the tube can be removed from the outlet table, and to be moved toward the outlet table to advance the piercing point 4 of the mandrel 5 to its working position adjacent the mill rolls 2 and 3 as shown in FIGURES 1 and 2.

The outlet table includes a frame 10 comprising longitudinally extending side frame members 11. The outlet table also preferably includes several hold-down guide members 12, and a plurality of roller devices 13. Each of the hold-down guide members 12 comprises a transversely extending bracket 14 supported on the side frame members 11; such bracket demountably supports a lower trough-shaped member 15 and an upper cap member 16, which members 15 and 16 may be changed as required for different diameters of tubes. Each of roller devices 13 comprises a roller 17, preferably with a grooved outer periphery, supported for rotation about an axis extending transversely of the pass line A of the outlet table; the roller is mounted on an arm member 18 rigidly fixed to a shaft 19 pivotally supported transversely of the outlet table. One end of each shaft 19 rigidly carries a lever 20, and the ends of all levers 20 are connected to an activating bar 21 extending longitudinally of the outlet table along one side of it. When the bar 21 is moved by suitable means, not shown, in the direction away from the mill rolls, the rollers 17 are simultaneously raised to their elevated positions in which they can support the mandrel bar for longitudinal movement toward the mill rolls at the beginning of a piercing operation or away from the mill rolls, or in which they can support the finished tube at the end of the piercing operation as shown in broken lines in FIGURE 1. At all other times in the operating cycle the rollers 17 are in their lowered position where they cannot contact either the mandrel or the tube, as shown in full lines in FIGURE 1.

The apparatus thus far described, although preferable, is but one type of outlet table in connection with which mandrel steadiers embodying the invention may be employed. In this apparatus, moreover, the outlet table 7 includes several mandrel bar steadiers, each generally indicated by reference numeral 30, which embody the invention; these steadiers are located between the roller devices 13.

Figure 4:
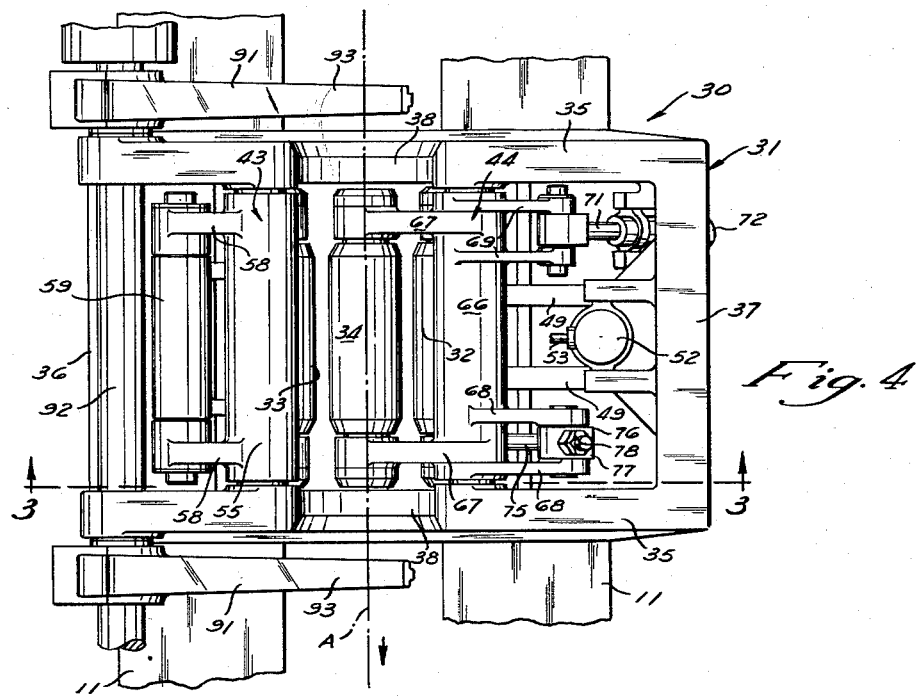
FIGURE 4 is a plan view of the mandrel bar steadier of FIGURE 3, to the same scale as FIGURE 3.

Each of the mandrel bar steadiers is identical, so only one will be described; that shown in FIGURES 3 and 4 is shown as rotatably supporting the tube 6 having the mandrel bar 5 inside of the tube, both tube 6 and bar 5 being shown in broken lines for the sake of clearness. Each of the illustrated mandrel bar steadiers comprises a frame 31 rigidly mounted on the side members 11 of frame 10 of the outlet table. This frame pivotally supports a plurality of rollers, three in the illustrated embodiment, identified by numerals 32, 33 and 34. These rollers, which have identical diameters, are rotatable about axes which are substantially parallel to and substantially equally angularly disposed around the pass line A of the outlet table; the rollers are pivotally supported independently of each other and are adapted to be moved to various positions toward and away from the pass line while their axes are substantially equiangularly spaced about and equidistant from the pass line. The rollers, therefore, are capable of rotatably supporting and steadying mandrel bars and pierced tubes of a wide range of diameters. Furthermore, one of the rollers in each of the illustrated mandrel bar steadiers is capable of being swung away from the pass line to permit the lateral removal of a finished tube or to permit lateral removal or replacement of a mandrel bar.

More specifically, the frame 31 which is shown as of cast construction, comprises two side members 35 rigidly connected to two cross members 36 and 37. The side members 35, which are identical in dimensions but are reversed versions of each other, rest on the frame members 11 of the outlet table; each has an upwardly opening recess 38 through which extends the pass line A of the outlet table and the mandrel and the tube being pierced, the recess being large enough to accommodate the largest diameter of tube to be made on the apparatus. Rollers 32, 33 and 34 are respectively carried by supporting members 42, 43 and 44 which are pivotally mounted between the side members 35 of the frame 31 of the mandrel bar steadier. The pivot axes of these supporting members are parallel to each other and substantially parallel to the pass line of the outlet table, and are equidistantly spaced from and equiangularly spaced about the pass line; each pivot axis is also parallel to the axis of rotation of the roller pivotally supported by such axis; and the distance between the axis of rotation of each roller and its pivot axis is the same on all members 42, 43, and 44.

Supporting member 42 comprises a body portion 45 pivotally mounted on a rigid shaft 46 rigidly mounted in the frame side members 35; spaced arms 47, rigidly fixed to body portion 45, rotatably carry the roller 32. The body portion 45 also has rigidly fixed to it a pair of spaced arms 48 by which supporting member 42 is operably connected to the supporting member 43 for roller 33, an actuating lever member 49 which is longer than the arms 47 and 48, and an arm 50 by which member 42 is operably connected to the supporting member 44 for roller 34. The end of lever 49 is pivotally connected to the piston rod 51 of a hydraulic cylinder 52 which is pivotally supported in an upright position from the cross member 37 of the frame 31 of the mandrel bar steadier. This hydraulic cylinder has a fluid conduit 53 at its closed upper end, and a fluid conduit 54 at its lower end through which the piston rod passes. These conduits are connected through suitable control means to a suitable source of hydraulic fluid under pressure, not shown.

Supporting member 43 for roller 33 comprises a body portion 55 pivotally mounted on a shaft 56 fixed to and between the side members 35 of the frame 31 of the mandrel bar steadier. Rigidly fixed to body portion 55 are spaced arms 57 which rotatably support the roller 33. The body portion 55 also rigidly carries spaced arms 58 which are pivotally connected to one end of a link member 59 the other end of which is pivotally connected to the ends of spaced arms 48 of the roller supporting member 42. The pivot axes at the ends of the link member 59 are spaced from each other by a distance equal to the distance between the axes of shafts 46 and 56 which pivotally carry the roller supporting members 42 and 43; and on member 42 the distance between the axis around which the member pivots and the axis of its pivotal connection to the link member 59 is identical to the corresponding distance on member 43. For these reasons the supporting member 43 is caused to move the same angular amount and in the same direction as supporting member 42, and the axes of rollers 32 and 33 are always spaced equally from the pass line A and in identical angular relation to each other.

Supporting member 44 for roller 34 comprises a body portion 65 pivotally mounted on shaft 66 fixed to and between side frame members 35 of the mandrel bar steadier frame. The body portion 65 rigidly carries a pair of spaced arms 67 which rotatably carry the roller 34; it also rigidly carries a pair of closely spaced arms 68 by which it is operatively connected to the supporting member 42 for roller 32. Furthermore, the body portion 65 has rigidly fixed to it a lever portion 69 the free end of which is pivotally connected to the piston rod 71 of a angularly positioned hydraulic cylinder 72. Cylinder 72 is supported by cross member 37 of frame 31 of the mandrel bar steadier, and has a fluid conduit 73 connected to its lower closed end, and a fluid conduit 74 connected to its upper piston rod end. These conduits communicate through suitable control means, not shown, with a suitable source of hydraulic fluid under pressure, which is also not shown; this source may be the same as that which supplies hydraulic fluid to cylinder 52.

A link member 75 is pivotally connected to the arms 50 rigidly fixed to the body portion 45 of supporting member 42 for roller 32, and also makes a pivotal connection to the arms 68 of member 44 supporting roller 34. This pivotal connection comprises a trunnion member 76 which is pivotally mounted at the ends of arms 68 and which is bored transversely of the pivot axis to slidably receive the end of the rod-shaped link member 75. The trunnion member 76 has a flat top surface 77 adapted to bear against the bottom of a pair of adjusting nuts 78, through a washer if desired. These nuts are adjustably threaded on the end of link member 75 to permit adjustment of the distance between the link member pivot axes on arms 50 and 68 of members 42 and 44. Preferably, this distance is adjusted to be equal to the distance between the axes of shafts 46 and 66 about which pivot the supporting members 42 and 44. The distance between the axis of shaft 46 and the axis about which link member 75 pivots on roller-supporting member 42 is identical with the distance between the axis of shaft 66 and the axis about which link member 75 pivots on roller-supporting mmeber 44. Consequently, so long as the trunnion surface 77 bears against the underside of the adjusting nuts 78, the roller-supporting arms 47 and 67 move in unison the same angular amount and in the same direction, and the rollers 32 and 34 are at all times spaced equally from the pass line A and have the identical angular relation to each other.

It is apparent that each of the roller-supporting members 42, 43 and 44 comprise a bell crank lever member having one arm portion which supports the roller and at least one actuating arm portion which is connected by a link member to an adjacent bell crank lever member; the geometry of the axes locations and other dimensions of the parts are such that so long as the top surface 77 of the trunnion member 76 bears against the adjusting nuts 78, all three rollers 32, 33 and 34 are equidistantly spaced from and equiangularly spaced around the pass line A. This is true whether the rollers are close to the pass line, as when supporting a mandrel bar of relatively small diameter as shown in FIGURE 6, or whether they are at the maximum distance away from the pass line, as when they are supporting a tube of large diameter as shown in FIGURE 3. Since, however, the trunnion member 76 is slidably mounted on a link member 75, it may be moved away from the adjusting nuts 78 when desired, causing the roller 34 to move away from the pass line independently of the other rollers to clear the space above the upwardly extending recesses 38 in the side members 35 of the mandrel bar steadier frame and permit transversely upward removal of the finished tube or the mandrel bar if desired, as shown in FIGURE 7.

Associated with each of the mandrel bar steadiers is a jack 81 located so that its top surface 82 is adapted to bear against the curved lower bearing surface 83 of the lever 49 forming part of roller-supporting member 42. In the illustrated apparatus, each of these jacks is of a conventional worm gear type and is adapted to be raised and lowered simultaneously and the same amount, by suitable rotation of a shaft 84 which extends longitudinally of the outlet table 7 and actuates the jacks 81 for all mandrel bar steadiers. In the illustrated apparatus, as is shown in FIGURE 1, this shaft is adapted to be rotated by a manually operable handle 85 connected to the shaft through a suitable gear box 86. Means for indicating the position of the top surfaces of the jacks 81 is also provided, comprising a suitably marked dial 87 having a rotatable pointer 88 adapted to be rotated by the shaft 84 through suitable gear means, not shown.

Each of the mandrel bar steadiers illustrated also includes means for removing the finished tube, or the mandrel bar, laterally upward when the rollers 34 are moved out of the way. Such means comprises a pair of arm members 91 located at opposite ends of each mandrel bar steadier and are adapted to be raised and lowered by a shaft 92 to which they are rigidly fixed and which is common to all arm members 91 of the outlet table. The shaft 92 is journaled at one side of each of the side members 35 of each mandrel bar steadier frame. These arm members 91 are so shaped and positioned that when they are in their lowermost positions and hence not operating to remove the pierced tube, their work-engaging surfaces 93 are located below the bottom of the recess 38 in the side frame members 35; and that when the arm members are pivoted about the axis of shaft 92 to their raised operating positions the tube can roll down the work-engaging surfaces 93 and can be discharged laterally from the outlet table 7. The means shown for actuating the arm comprises a pivotally mounted hydraulic cylinder 94 connected to a suitable crank arm 95 rigidly mounted on shaft 92.

The preferred method of operation of the illustrated apparatus is as follows:

At the beginning of the described cycle of operations, the jacks 81 are all adjusted simultaneously by actuating shaft 84 so that their top surfaces 82 are located at identical heights in positions such that when they are contacted by surfaces 83 on the levers 49 of the mandrel bar steadiers, they will locate the rollers of each steadier in positions where they will accept and bear against a tube of the desired diameter to be produced, this being indicated by the position of pointer 88 on dial 87. Initially the rollers 32 and 33 are in the position determined by the jacks 81 and the upper rollers 34 of all mandrel bar steadiers are swung away from the pass line A to leave unobstructed the recesses 38 in the mandrel bar steadier side frames 35. The roller devices 13 are all in their uppermost positions, having been raised by the actuating bar 21. The rollers 32, 33 and 34 are then in the positions shown in FIGURE 7.

The mandrel carriage 8 is then advanced, moving the mandrel bar 5 longitudinally on the grooved rollers 17 of the roller devices 13, which support and guide the bar as it moves to a position where its piercing point is in operating position adjacent the piercing mill rolls 2 and 3.

The rollers 32, 33 and 34 of all mandrel bar steadiers are then moved inwardly toward the pass line and to the mandrel bar 5 until they contact the mandrel bar, to the positions shown in full lines in FIGURE 6. This is accomplished by opening the valves in the conduits 53 and 54 of hydraulic cylinder 52 to permit hydraulic fluid to flow freely into and out of such cylinder, and by supplying hydraulic fluid under pressure through the conduit 73 to the closed end of hydraulic cylinder 72. Such admission of fluid into cylinder 72 moves upwardly the piston rod 71 and the lever 69 pivotally connected to it; this causes the roller 34 to move inwardly toward the pass line A until the roller contacts the mandrel bar 5; it also causes the parallel arms 68 to move upwardly until the surface 77 of trunnion member 76 pivotally carried by the arms contacts the underside of adjusting nuts 78 on link member 75, thus moving such link member upwardly and moving inwardly toward the pass line the rollers 32 and 33 operably connected to each other and to the link member 75, such rollers being so moved until they bear against the mandrel bar 5. The axes of rollers 32, 33 and 34 are now equidistantly spaced from and equiangularly spaced around the pass line A and equidistantly and equiangularly spaced from adjacent rollers, and all rollers bear against the mandrel bar. When all the rollers thus contact the mandrel bar, the hydraulic pressure increases in conduit 73 of cylinder 72 to a magnitude at which it actuates a pressure responsive switch, not shown, which controls the valves in the fluid conduits of both cylinders so that all fluid conduits to such cylinders are closed. This prevents the rollers 32, 33 and 34 from being forced outwardly back, except a small amount permitted by fluid compressibility, but does not cause the rollers to bear on the mandrel bar with sufficient force to inhibit its rotation.

Simultaneously with, or immediately after, the above-described operation of bringing the rolls 32, 33 and 34 into bearing against the mandrel bar and locking them in position, the roller devices 13 are moved to their lowermost positions by the actuating bar 21, so that the mandrel bar and mill rolls are ready for operation.

As the pierced portion of tube 6 advances lengthwise of the outlet table 7 from the piercing rolls 2 and 3, the rollers of the mandrel bar steadier 30 which the tube is approaching are shifted to the tube diameter position by being moved away from the pass line A. This is accomplished by admitting hydraulic fluid under pressure through conduit 53 to the closed end of cylinder 52 so that its piston rod 51 moves the outer end of lever 49 downwardly until it contacts the top surface 82 of the associated jack 81; simultaneously hydraulic fluid under pressure is introduced through conduit 73 into the closed end of smaller cylinder 72, thus moving upwardly piston rod 71 and raising the lever 69 of roller-supporting member 44, the movement of member 44 being, of course, limited by bearing of the trunnion member 76 against the adjusting nuts 78 of the link member 75. Since the hydraulic cylinder 52 of larger diameter exerts greater force on the system of rollers than does the hydraulic cylinder 72 of smaller diameter, the cylinder 52 controls or governs the movement of arm 44, the trunnion member 76 being held in contact with the adjusting nuts 78. The linkage described above, including link members 59 and 75, together with the above-described relationships of the axes of the rollers, of the roller-supporting members, and of the linkage members, insure that in this tube-receiving position which is determined by the jack 81, the rollers 32, 33 and 34 are equidistantly spaced from the pass line and equiangularly spaced around it. The rollers of the various mandrel bar steadiers are sequentially thus shifted to their outer tube-receiving positions as the pierced tube approaches each steadier. The above-described movements of the rollers may be performed by manual control or by automatic control through suitable means not shown.

After the tube 6 has been completely pierced and has left the piercing rolls 2 and 3, the rollers 34 of all mandrel bar steadiers are raised in substantial unison, independently of the rollers 32 and 33, by admitting hydraulic fluid under pressure through the conduits 74 to the piston rod ends of the cylinders 72 of the mandrel bar steadiers; this is made possible by the sliding connection of the trunnion member 76 on the link member 75 of each of the mandrel bar steadiers. The rollers and their supporting arms on each mandrel bar steadier are then in the positions shown in FIGURE 7. The actuating bar 21 is then moved to raise all of the roller devices 13 to their elevated positions where their rollers 17 contact and lift the tube off the rollers 32 and 33. The mandrel bar 4 is then withdrawn from the tube 6 by retraction of the mandrel carriage 8.

The tube 6 is then removed from the outlet table 7. For this purpose, hydraulic cylinder 94 is actuated by the introduction of hydraulic fluid under pressure to partially rotate the shaft 92 to raise the arm members 91 which lift the finished tube 6 from the mandrel steadiers and let it discharge by rolling down the work engaging surfaces 93 of the arm members. The apparatus has now completed a cycle and is ready to begin another cycle as described above.

From the foregoing description of a preferred form of the invention, it will be evident that I have provided a simple and sturdy mandrel bar steadier in which relatively large rollers can be employed because only three are required to support the mandrel bar, and in which adjustments for a wide range of sizes of mandrel bars and pierced tubes can be easily made without requiring changes in the size of the rollers. The actuating linkage is such that so long as the trunnion member 76 bears against the adjustable stop nuts 78, the hydraulic cylinder 72 being provided to accomplish this at all times except when it moves the roller 34 upwardly to clear the top of the steadier, all rollers are located equidistantly from the pass line and equiangularly around the pass line, and each roller is the same distance from its two adjacent rollers. Notwithstanding this, the apparatus is so designed that the upper roller 34 can be moved out of the way independently of the other two rollers to permit lateral removal of the pierced tube, and of the mandrel bar if desired, but yet can be rapidly moved back into position where it maintains the equiangular and equidistant relationship described above, without the necessity of subsequent adjustments. The apparatus is simple and fool-proof in operation, and of extremely rugged construction. While three rollers are shown, this being the minimum number which will provide the desired steadying action hence the desirable number, a greater number of rollers may be employed.

Those skilled in the art will appreciate that various changes and modifications, including others than those indicated above, can be made in the invention without departing from the spirit and the scope thereof. The essential features of the invention are defined in the appended claims.

I claim:

1. Apparatus for supporting an elongated generally cylindrical member having an axis so its axis substantially coincides with a pass line of a metal working machine, said apparatus comprising a frame which is stationary relatively to said pass line; at least three rollers which are rotatable about axes which are essentially equiangularly spaced about essentially equidistantly spaced from, and essentially parallel to said pass line when said apparatus operates to support the elongated member; a separate supporting member rotatably supporting each of said rollers independently of the other rollers, each of said supporting members being pivotally mounted on said frame about an individual pivot axis which is essentially parallel to said pass line and separate from the pivot axes about which are pivotally mounted supporting members for the other rollers, said pivot axes being essentially equiangularly spaced about and essentially equidistantly spaced from said pass line and fixed relative to each other, and the distance between the pivot axis and the axis of rotation of the roller on each supporting member being essentially equal to that on all other supporting members; and linkage means connecting all of said supporting members to pivotally move them in the same angular direction essentially in unison and essentially the same angular amount so all said rollers move to various positions toward said pass line while their axes are essentially equiangularly spaced about and essentially equidistantly spaced from said pass line, one of said supporting members being connected to said linkage means by means permitting movement of said supporting member relatively to said linkage means in one direction independently of the other supporting members so that said independently movable supporting member and the roller supported thereby can be pivotally moved away from said pass line independently of said other supporting members to permit an elongated member to be laterally inserted into or removed from the space between the other rollers.

2. The apparatus of claim 1 comprising means limiting movement of said independently movable supporting member so that the axis of the roller carried thereby at one time can be essentially closer to said pass line than the axes of the other rollers; first actuating means for moving said supporting members other than said independently movable supporting member so that their rollers move toward and away from said pass line; and second actuating means for moving said independently movable supporting member so the axis of its roller moves toward said pass line to the extent permitted by said limiting means and so the axis of its roller moves away from said pass line sufficiently to permit access to the space between said other rollers.

References Cited in the file of this patent

UNITED STATES PATENTS

| | | |
|---|---|---|
| 843,867 | Capron | Feb. 12, 1907 |
| 2,263,744 | Smith | Nov. 25, 1941 |
| 2,459,068 | Eastwood | Jan. 11, 1949 |
| 2,686,444 | Reichl | Aug. 17, 1954 |
| 2,883,198 | Narumi | Apr. 21, 1959 |

FOREIGN PATENTS

| | | |
|---|---|---|
| 410,798 | Italy | June 11, 1945 |